United States Patent
Matsuda

(10) Patent No.: US 12,490,976 B2
(45) Date of Patent: Dec. 9, 2025

(54) MEDICAL SUTURE THREAD

(71) Applicant: KEISEI MEDICAL INDUSTRIAL CO., LTD., Tokyo (JP)

(72) Inventor: Jumpei Matsuda, Tokyo (JP)

(73) Assignee: KEISEI MEDICAL INDUSTRIAL CO., LTD., Tokyo (JP)

( * ) Notice: Subject to any disclaimer, the term of this patent is extended or adjusted under 35 U.S.C. 154(b) by 385 days.

(21) Appl. No.: 17/782,449

(22) PCT Filed: Nov. 27, 2020

(86) PCT No.: PCT/JP2020/044307
§ 371 (c)(1),
(2) Date: Jun. 3, 2022

(87) PCT Pub. No.: WO2021/117513
PCT Pub. Date: Jun. 17, 2021

(65) Prior Publication Data
US 2023/0000490 A1 Jan. 5, 2023

(30) Foreign Application Priority Data
Dec. 11, 2019 (JP) ................................. 2019-223469

(51) Int. Cl.
*A61B 17/06* (2006.01)
*A61L 17/04* (2006.01)

(52) U.S. Cl.
CPC ........ *A61B 17/06166* (2013.01); *A61L 17/04* (2013.01); *A61B 2017/06171* (2013.01)

(58) Field of Classification Search
CPC .... A61B 17/06166; A61B 2017/06171; A61B 17/06185; A61B 2017/00831; A61L 17/04; A61L 17/145
See application file for complete search history.

(56) References Cited

U.S. PATENT DOCUMENTS 4,047,533 A * 9/1977 Perciaccante ......... A61L 17/145
428/375
2005/0149118 A1* 7/2005 Koyfman ................ A61L 17/04
606/228

(Continued)

FOREIGN PATENT DOCUMENTS

JP 2006-152306 A 6/2006
JP 2010-513678 A 4/2010
WO 2016/093377 A1 6/2016

OTHER PUBLICATIONS

International Search Report dated Jan. 26, 2021, for PCT/JP2020/044307.

(Continued)

*Primary Examiner* — Mohamed G Gabr
*Assistant Examiner* — Khoa Tan Le
(74) *Attorney, Agent, or Firm* — RANKIN, HILL & CLARK LLP

(57) ABSTRACT

Provided is a medical suture thread as a multifilament, which is formed easily bendable and ensuring favorable operability. The medical suture thread 100 includes a core thread 110 and an outer thread 120. The core thread 110 includes multiple twisted ultrafine threads 111, and is arranged at a center portion of the medical suture thread 100. In the ultrafine thread 111, an inner-filament cover layer 112 made of 2-methacryloyloxyethyl phosphorylcholine (MPC) is formed on an outer surface of a filament 111a. The outer thread 120 is formed to be braided with multiple ultrafine threads 121, and covers an outer surface of the core thread 110. In the ultrafine thread 121, an outer-filament cover layer 122 made of MPC is formed on an outer surface of a filament 121a.

8 Claims, 1 Drawing Sheet

(56) References Cited

U.S. PATENT DOCUMENTS

| | | |
|---|---|---|
| 2006/0193884 A1 | 8/2006 | Stopek et al. |
| 2010/0094339 A1* | 4/2010 | Stopek .................. A61L 17/145 |
| | | 524/318 |
| 2019/0223868 A1* | 7/2019 | Coffey .................. D07B 1/025 |

OTHER PUBLICATIONS

Office Action mailed on Mar. 16, 2021 for the corresponding Japanese Patent Application No. 2019-223469; English machine translation included.

Yuan, Bo et al., "Copolymer Coatings Consisting of 2-Methacryloyloxyethyl Phosphorylcholine and 3-Methacryloxypropyl Trimethoxysilane via ATRP To Improve Cellulose Biocompatibility", ACS Applied Materials & Interfaces, Aug. 2, 2012, vol. 4, Issue 8, pp. 4031-4039, https://pubs.acs.org/doi/10.1021/am3008399; Cited in ISR & JPOA; English Text.

* cited by examiner

MEDICAL SUTURE THREAD

TECHNICAL FIELD

The present invention relates to a medical suture thread used for medical action such as a surgery or injury treatment.

BACKGROUND ART

Typically, a medical suture thread used for medical action such as a surgery or injury treatment has been used. Of this medical suture thread, an outer surface is coated with various resin materials for the purpose of improving operability in suturing and slidability or slide-down performance (the easiness of moving a knot upon thread tying) on a sutured portion. For example, Patent Literature 1 below discloses that a suture thread is coated with 2-methacryloyloxyethyl phosphorylcholine (hereinafter referred to as "MPC"). This can enhance easiness and retainability when a surgeon ties the suture thread.

CITATION LIST

Patent Literature

PATENT LITERATURE 1: JP-A-2010-513678

However, in the suture thread described in Patent Literature 1 above, the suture thread is coated. That is, a resin layer made of MPC is formed on an outer surface of the suture thread. Thus, in the case of a multifilament suture thread including a single thread having an assembly of a plurality of fibrous ultrafine threads, the entirety of the suture thread is less bendable due to friction among the ultrafine threads arranged inside the suture thread. As a result, there is a problem that the operability of the suture thread in medical action is degraded.

The present invention has been made to cope with the above-described problem. An object of the present invention is to provide a medical suture thread as a multifilament, which is formed easily bendable and ensuring favorable operability.

SUMMARY OF INVENTION

In order to achieve the above object, as a feature of the present invention, there is provided a medical suture thread as a multifilament including a single thread having an assembly of a plurality of fibrous ultrafine threads. The ultrafine threads are arranged inside the multifilament, and an inner-filament cover layer made of 2-methacryloyloxyethyl phosphorylcholine (MPC) is formed on an outer surface of each ultrafine thread not exposed at an outer surface of the multifilament.

According to the feature of the present invention configured as described above, the medical suture thread is configured such that the inner-filament cover layer made of MPC is formed on the outer surface of each ultrafine thread arranged inside without exposed at the outer surface of the multifilament. Thus, friction among the ultrafine threads can be reduced. Consequently, the entirety of the suture thread is easily bendable. As a result, favorable operability can be ensured.

Moreover, as another feature of the present invention, in the medical suture thread, the multifilament includes: a core thread having an assembly of a plurality of the ultrafine threads and arranged at a center portion of the multifilament; and an outer thread arranged outside the core thread and covering the core thread without the core thread being exposed. The inner-filament cover layer is formed on each ultrafine thread forming the core thread.

According to another feature of the present invention configured as described above, the medical suture thread includes the core thread having the assembly of multiple ultrafine threads and arranged at the center portion of the multifilament and the outer thread arranged outside the core thread and covering the core thread without the core thread being exposed. In addition, the inner-filament cover layer is formed on each ultrafine thread forming the core thread. Thus, friction among the ultrafine threads in the core thread is reduced. Consequently, the bendability of the entirety of the suture thread is improved. As a result, favorable operability can be ensured. In this case, the core thread may be formed of linearly-arranged bundles of multiple ultrafine threads linearly arranged in parallel. Alternatively, the core thread may include a braided thread braided with the multiple ultrafine threads. Alternatively, the core thread may include a twisted thread formed of the multiple twisted ultrafine threads.

Moreover, as another feature of the present invention, in the medical suture thread, the core thread includes: a braided thread braided with the plurality of ultrafine threads; or a twisted thread in which the plurality of ultrafine threads is twisted.

According to another feature of the present invention configured as described above, friction among the ultrafine threads of the core thread is reduced in the medical suture thread even if the core thread includes the braided thread braided with the multiple ultrafine threads or the twisted thread formed of the multiple twisted ultrafine threads. Thus, the bendability of the entirety of the suture thread is improved. As a result, favorable operability can be ensured.

Moreover, as another feature of the present invention, in the medical suture thread, an outer-filament cover layer made of the 2-methacryloyloxyethyl phosphorylcholine (MPC) is formed on an outer surface of each ultrafine thread exposed at the outer surface of the multifilament, and the inner-filament cover layer is formed to have a smaller thickness than that of the outer-filament cover layer.

According to another feature of the present invention configured as described above, in the medical suture thread, the inner-filament cover layer is formed to have a smaller thickness than that of the outer-filament cover layer formed on the outer surface of each ultrafine thread exposed at the outer surface of the multifilament, the outer-filament cover layer being made of 2-methacryloyloxyethyl phosphorylcholine (MPC). Thus, an increase in the outer diameter of the suture thread can be suppressed while the bendability of the entirety of the suture thread is improved. As a result, favorable operability can be ensured.

Moreover, as another feature of the present invention, in the medical suture thread, the inner-filament cover layer is formed to have a weight of equal to or greater than 0.05% and less than 0.3% with respect to a total weight of a filament forming each ultrafine thread, the inner-filament cover layer being formed on the filament.

According to another feature of the present invention configured as described above, the medical suture thread is formed such that the weight of the inner-filament cover layer is a weight of equal to or greater than 0.05% and less than 0.3% with respect to the total weight of the filament formed with the inner-filament cover layer thereon. Thus, bonding among the ultrafine threads can be prevented while the probability of the medical suture thread remaining curled is reduced. Meanwhile, an increase in the outer diameter of the medical suture thread can be suppressed while the bendability of the entirety of the medical suture thread is improved. As a result, favorable operability can be ensured.

DESCRIPTION OF EMBODIMENTS

Figure 1:
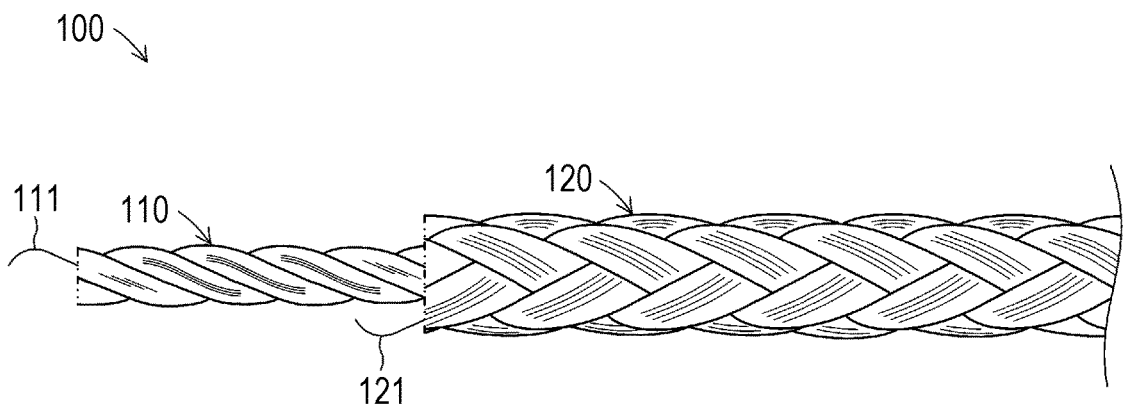
FIG. 1 is an exploded side view schematically showing the outline of an external configuration and an internal configuration of a medical suture thread according to one embodiment of the present invention.

Hereinafter, one embodiment of a medical suture thread according to the present invention will be described with reference to the drawings. FIG. 1 is an exploded side view schematically showing the outline of an external configuration and an internal configuration of a medical suture thread 100 according to the present invention. Note that in each figure as a reference in the present specification, some components are schematically shown using, e.g., exaggerated notation for the sake of easy understanding of the present invention. Thus, the dimensions of the components, the ratios among the components, and the like may vary. The medical suture thread 100 is a tool for suturing part of body tissues such as the skin, muscles, or organs of a human or an animal.

(Configuration of Medical Suture Thread 100)

The medical suture thread 100 mainly includes a core thread 110 and an outer thread 120. The core thread 110 is a thread arranged inside the medical suture thread 100. The core thread 110 includes an assembly of multiple ultrafine threads 111. In the present embodiment, two bundles of multiple assembled ultrafine threads 111 are twisted to form a single thread in the configuration of the core thread 110. Thus, the core thread 110 is, in the present embodiment, formed to have a thickness of about 0.27 mm.

Figure 2:
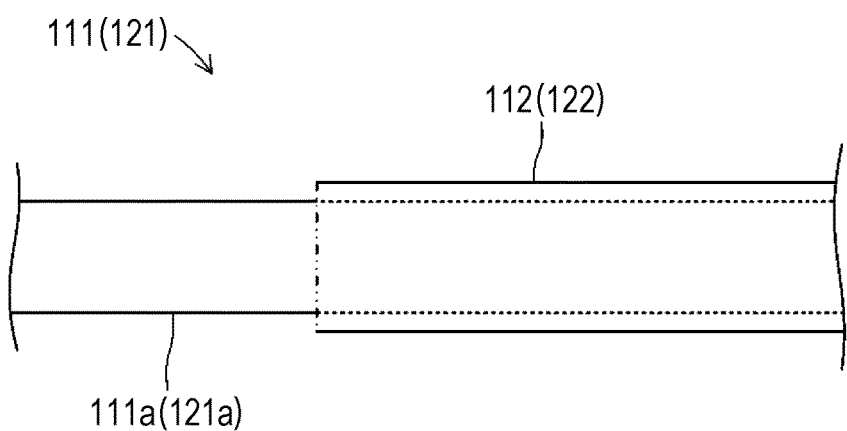
FIG. 2 is an exploded side view schematically showing the outline of an external configuration and an internal configuration of an ultrafine thread forming each of a core thread and an outer thread in the medical suture thread shown in FIG. 1.

As shown in FIG. 2, the ultrafine thread 111 is the minimum unit of thread forming the core thread 110. The ultrafine thread 111 includes a filament 111a made of a resin material, a natural material, or a metal material. In this case, the resin material to be used may include, for example, nylon, polypropylene, polyester, and polyvinylidene fluoride (PVDF). The natural material to be used may include catgut (a thread formed of twisted animal intestines) and a silken thread. The metal material to be used may include stainless steel, titanium, and magnesium.

The thickness of the ultrafine thread 111 varies according to the thickness of the medical suture thread 100. The ultrafine thread 111 is formed such that the thickness thereof is equal to or greater than about 1 μm and equal to or less than about 1 mm. In the present embodiment, the ultrafine thread 111 is formed of a polyester thread with a thickness of about 10 μm.

In the ultrafine thread 111, an inner-filament cover layer 112 is formed on a surface of the filament 111a. The inner-filament cover layer 112 is a resin layer covering the outer surface of the filament 111a of the ultrafine thread 111 and containing 2-methacryloyloxyethyl phosphorylcholine (MPC). In this case, the inner-filament cover layer 112 may be made only of MPC. Alternatively, the inner-filament cover layer 112 may be formed such that MPC is contained as a main component, of which content rate is the highest as compared to the other components, among the components forming the inner-filament cover layer 112. In the present embodiment, the inner-filament cover layer 112 is made only of MPC.

Figure 3:
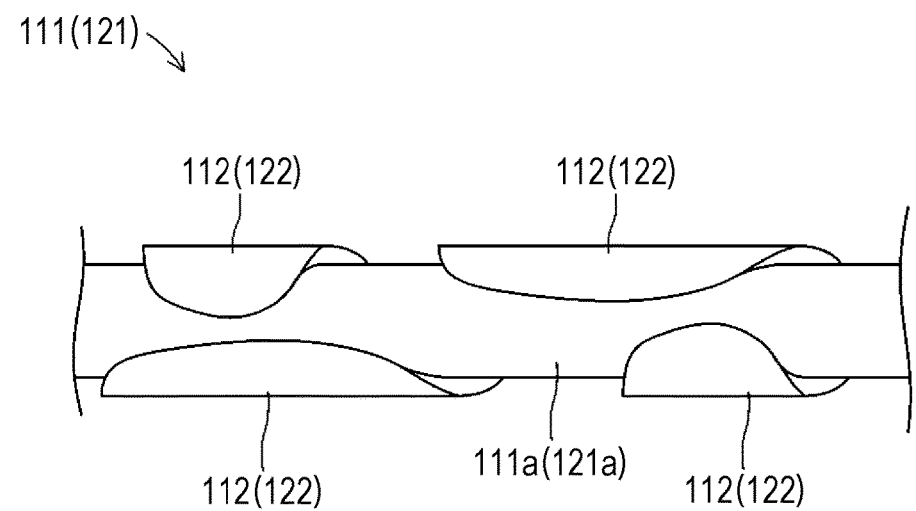
FIG. 3 is a partially-enlarged side view showing the state of a cover layer partially formed on an outer surface of an ultrafine thread forming a medical suture thread according to a variation of the present invention.

The inner-filament cover layer 112 is preferably formed to completely cover the outer surface of the filament 111a. The inner-filament cover layer 112 may be formed to cover 50% or more (more preferably 80% or more) of the surface area of the filament 111a with the substantially uniform formation density in each of axial and peripheral directions of the filament 111a. That is, the inner-filament cover layer 112 may be, as shown in FIG. 3, formed on the outer surface of the filament 111a in a patchy manner with part of the outer surface being exposed.

The substantially uniform formation density in each of the axial and peripheral directions of the filament 111a as described herein indicates a state in which a portion (a portion formed with no inner-filament cover layer 112) with the exposed outer surface of the filament 111a and a portion formed with the inner-filament cover layer 112 are substantially equally arranged in each of the axial and peripheral directions of the filament 111a. It may only be required that when the outer surface of the filament 111a is observed using a magnifying glass such as an electronic microscope, the formation density is substantially uniform to such an extent that the exposed portion of the outer surface of the filament 111a and the portion of the outer surface formed with the inner-filament cover layer 112 seem to be equally arranged. Such arrangement is not necessarily precisely-equal arrangement.

The inner-filament cover layer 112 is formed on the outer surface of the filament 111a within a weight range of equal to or greater than 0.05% and less than 0.3% with respect to the total weight of the filament 111a. The inner-filament cover layer 112 may be formed on the outer surface of the filament 111a with a weight exceeding 0.3% with respect to the total weight of the filament 111a. Note that there are characteristics that the medical suture thread 100 becomes harder or less bendable as the weight and thickness of the inner-filament cover layer 112 increase.

That is, the inner-filament cover layer 112 is formed on the outer surface of the filament 111a within a weight range of equal to or greater than 0.05% and less than 0.3% with respect to the total weight of the filament 111a. This can reduce hardening of the medical suture thread 100. Moreover, flexibility can be held. In this case, the thickness of the inner-filament cover layer 112 is set according to use application of the medical suture thread 100 or a user's preference. In the present embodiment, the inner-filament cover layer 112 is formed on the outer surface of the filament 111a with a weight of 0.1% with respect to the total weight of the filament 111a. Note that the inner-filament cover layer 112 is formed within a weight range of equal to or greater than 0.1% and less than 0.3% with respect to the total weight of the filament 111a. This facilitates formation of the inner-filament cover layer 112 as compared to the case of forming the inner-filament cover layer 112 with a weight of less than 0.1% with respect to the total weight of the filament 111a.

The outer thread 120 is a thread arranged to cover an outer surface of the above-described core thread 110. The outer thread 120 includes an assembly of multiple ultrafine threads 121. In the present embodiment, the outer thread 120 is formed in such a manner that six bundles of multiple assembled ultrafine threads 121 are braided to form a single thread. Thus, the outer thread 120 is formed with a thickness of about 0.6 mm in the present embodiment. That is, in the present embodiment, the medical suture thread 100 is formed with a thickness of about 0.6 mm. The outer thread 120 is formed to completely cover the outer surface of the core thread 110.

The ultrafine thread 121 is the minimum unit of thread forming the outer thread 120. The ultrafine thread 121 includes a filament 121a made of a resin material, a natural material, or a metal material. In this case, the resin material to be used may include, for example, nylon, polypropylene, polyester, and polyvinylidene fluoride (PVDF). The natural material to be used may include catgut (a thread formed of twisted animal intestines) and a silken thread. The metal material to be used may include stainless steel, titanium, and magnesium.

The thickness of the ultrafine thread 121 varies according to the thickness of the medical suture thread 100. The ultrafine thread 121 is formed such that the thickness thereof is equal to or greater than about 1 µm and equal to or less than about 1 mm. In the present embodiment, the ultrafine thread 121 is formed of a polyester thread with a thickness of about 10 µm. That is, the ultrafine threads 121 is formed of the exact same thread as that of the ultrafine thread 111 in the present embodiment. Note that the ultrafine thread 121 is formed as necessary according to the specifications of the medical suture thread 100. Thus, the ultrafine thread 121 may be made of a material different from that of the ultrafine thread 111, and/or may be formed with a diameter different from that of the ultrafine thread 111, needless to say.

As shown in FIG. 2, in the ultrafine thread 121, an outer-filament cover layer 122 is formed on a surface of the filament 121a. The outer-filament cover layer 122 is a resin layer covering the outer surface of the filament 121a and containing 2-methacryloyloxyethyl phosphorylcholine (MPC). In this case, the outer-filament cover layer 122 may be made only of MPC. Alternatively, the outer-filament cover layer 122 may be formed such that MPC is contained as a main component, of which content rate is the highest as compared to the other components, among the components forming the outer-filament cover layer 122. The outer-filament cover layer 122 may be made of a resin material other than MPC or synthetic resin containing, as a main component, resin other than MPC. In the present embodiment, the outer-filament cover layer 122 is made only of MPC.

The outer-filament cover layer 122 is preferably formed to completely cover the outer surface of the filament 121a. The outer-filament cover layer 122 may be formed to cover 50% or more (more preferably 80% or more) of the surface area of the ultrafine thread 121 with a substantially uniform formation density in each of axial and peripheral directions of the filament 121a. That is, the outer-filament cover layer 122 may be, as shown in FIG. 3, formed on the outer surface of the filament 121a in a patchy manner with part of the outer surface being exposed. Note that the substantially uniform formation density in each of the axial and peripheral directions of the filament 121a as described herein is similar to that of the inner-filament cover layer 112. Thus, description thereof will be omitted.

The outer-filament cover layer 122 is formed on the outer surface of the filament 121a within a weight range of equal to or greater than 0.05% and less than 0.3% with respect to the total weight of the filament 121a. The outer-filament cover layer 122 may be formed on the outer surface of the filament 121a with a weight exceeding 0.3% with respect to the total weight of the filament 121a. Note that there are characteristics that the medical suture thread 100 becomes harder or less bendable or rough texture of the medical suture thread 100 increases as the weight and thickness of the outer-filament cover layer 122 increase. Note that the outer-filament cover layer 122 is formed within a weight range of equal to or greater than 0.1% and less than 0.3% with respect to the total weight of the filament 121a. This facilitates formation of the outer-filament cover layer 122 as compared to the case of forming the outer-filament cover layer 122 with a weight of less than 0.1% with respect to the total weight of the filament 121a.

That is, the outer-filament cover layer 122 is formed on the outer surface of the filament 121a within a weight range of equal to or greater than 0.05% and less than 0.3% with respect to the total weight of the filament 121a. This can provide the flexibility or smooth texture of the medical suture thread 100. In this case, the thickness of the outer-filament cover layer 122 is set according to use application of the medical suture thread 100 or a user's preference. In the present embodiment, the outer-filament cover layer 122 is, as in the inner-filament cover layer 112, formed on the outer surface of the filament 121a with a weight of 0.1% with respect to the total weight of the filament 121a.

That is, the ultrafine thread 121 has the exact same configuration as that of the ultrafine thread 111 in the present embodiment. Note that the outer-filament cover layer 122 with a configuration different from that of the inner-filament cover layer 112 may be formed. Alternatively, the ultrafine thread 121 may be formed without the outer-filament cover layer 122. Note that FIG. 1 shows one extracted ultrafine thread 111 and one extracted ultrafine thread 121 for the sake of easy understanding of the internal structure of the medical suture thread 100. In addition, the inner-filament cover layer 112 and the outer-filament cover layer 122 are not shown in the figure. Each of FIGS. 2 and 3 shows, by one common view, the ultrafine thread 111 and the ultrafine thread 121.

(Manufacturing of Medical Suture Thread 100)

Next, the process of manufacturing the medical suture thread 100 will be described. A worker manufacturing the medical suture thread 100 first prepares the ultrafine thread 111 formed with no inner-filament cover layer 112 and the ultrafine thread 121 formed with no outer-filament cover layer 122. Specifically, the filaments 111a, 121a are prepared as bases of the ultrafine threads 111, 121.

In this case, the filaments 111a, 121a are manufactured by the typical technique of manufacturing a suture thread. Thus, the worker may manufacture the filaments 111a, 121a as the bases of the ultrafine threads 111, 121 by the worker oneself. Alternatively, a commercially-available filament may be purchased and obtained. In the present embodiment, the worker prepares the polyester filaments 111a, 121a with a size of No. 11-0 (about 20 µm) (the standard for a suture thread according to the Pharmaceutical Affairs Act).

Next, the worker forms the inner-filament cover layer 112 and the outer-filament cover layer 122 on the filaments 111a, 121a. Specifically, the worker dips the filaments 111a, 121a in a solution (e.g., an ethanol solution) containing MPC. In this manner, the inner-filament cover layer 112 and the outer-filament cover layer 122 can be formed on the surfaces of the filaments 111a, 121a.

In this case, the worker can dip the filament in the solution containing MPC in a state in which the multiple filaments 111a, 121a are gathered and bundled, a roll state in which each of the filaments 111a, 121a is wound in an annular shape, or a state in which each of the filaments 111a, 121a wound in a roll shape is drawn in a linear shape. The concentration of the solution containing MPC and the time of dipping the filaments 111a, 121a are respectively determined as necessary according to the thicknesses of the inner-filament cover layer 112 and the outer-filament cover layer 122 to be formed.

Then, the worker performs drying treatment and sterilization treatment for the filaments 111a, 121a taken out of the solution containing MPC. In this manner, the worker can obtain the ultrafine threads 111, 121 formed with the inner-filament cover layer 112 and the outer-filament cover layer 122 on the outer surfaces of the filaments 111a, 121a, respectively. Note that the worker provides vibration to the filaments 111a, 121a or sets a drying temperature to a high temperature upon drying of the filaments 111a, 121a, and in this manner, can form the inner-filament cover layer 112 and the outer-filament cover layer 122 on the surfaces of the filaments 111a, 121a in a patchy manner.

Next, the worker forms the core thread 110. Specifically, the worker twists two bundles of multiple gathered ultrafine threads 111 by means of a not-shown twisting machine. In this manner, the single core thread 110 is formed. In the present embodiment, the worker can form the core thread 110 with a thickness of about 0.27 mm.

Next, the worker forms the outer thread 120. Specifically, the worker braids the outer thread 120, which is formed of five bundles of multiple gathered ultrafine threads 121, on the outside of the core thread 110 by means of a not-shown braiding machine. In this manner, a single thread is formed. That is, by the step of forming the outer thread 120, the medical suture thread 100 including the core thread 110 completely covered with the outer thread 120 is formed. The medical suture thread 100 is formed with an outer diameter of about 0.6 mm in the present embodiment.

Next, the worker can complete the medical suture thread 100 through the steps of sterilizing, checking, and packing the medical suture thread 100. In this case, the medical suture thread 100 is housed in a packaging container (not shown) in a state in which the medical suture thread 100 is wound in a circular ring shape. Alternatively, the medical suture thread 100 may be packed with a medical tool such as a suture needle being coupled to a tip end portion of the medical suture thread 100. Note that the worker can form the inner-filament cover layer 112 and the outer-filament cover layer 122 on a medical suture thread 100 formed with no inner-filament cover layer 112 and no outer-filament cover layer 122.

Specifically, the worker processes the filaments 111a by means of the not-shown twisting machine. After formation of the core thread 110, the ultrafine threads 121 are braided using the not-shown braiding machine and the filaments 121a. In this manner, the medical suture thread 100 (i.e., a half-finished product of the medical suture thread 100) is formed at an outer peripheral portion of the core thread 110. Next, the worker dips the half-finished product of the medical suture thread 100 in the solution containing MPC. In this case, the worker causes a sufficient solution to penetrate the medical suture thread 100 to each ultrafine thread 111 (each filament 111a) forming the core thread 110.

In this case, the worker can intermittently change tension to be applied to the half-finished product of the medical suture thread 100 in the solution containing MPC. In this manner, a sufficient solution can penetrate the medical suture thread 100 to each ultrafine thread 111 (each filament 111a) forming the core thread 110. In this manner, the worker forms the inner-filament cover layer 112 and the outer-filament cover layer 122 on the outer surfaces of the filaments 111a, 121a, respectively. Accordingly, the worker can obtain the medical suture thread 100 formed of the ultrafine threads 111, 121 including these filaments and cover layers.

(Operation of Medical Suture Thread 100)

Next, operation of the medical suture thread 100 configured as described above will be described. A user such as a doctor couples a medical tool (not shown) such as a suture needle to the medical suture thread 100 unpacked from the package. Then, the user takes medical action such as a surgery or injury treatment. Moreover, the user takes medical action such as removal of the medical suture thread 100 sutured to an affected area of a patient. In this case, in the medical suture thread 100, not only the outer thread 120 but also the core thread 110 inside the outer thread 120 are arranged, and the inner-filament cover layer 112 made of MPC is formed as an outer layer of each ultrafine thread 111 forming the core thread 110. Thus, friction among the ultrafine threads 111 is reduced. Consequently, the medical suture thread 100 is easily bendable. As a result, the user can easily operate the medical suture thread 100.

As can be understood from description of operation above, according to the above-described embodiment, the medical suture thread 100 is configured such that the inner-filament cover layer 112 made of MPC is formed on the outer surface of the ultrafine thread 111 arranged inside the multifilament without the ultrafine thread 111 being exposed at the outer surface of the multifilament. Thus, friction among the ultrafine threads 111 can be reduced, and therefore, the entirety of the medical suture thread 100 is easily bendable. Accordingly, favorable operability can be ensured.

Further, the embodiment of the present invention is not limited to the above-described embodiment. Various changes can be made to the above-described embodiment without departing from the object of the present invention.

For example, in the above-described embodiment, in the medical suture thread 100, the inner-filament cover layer 112 is formed on the ultrafine thread 111 forming the core thread 110. Moreover, the outer-filament cover layer 122 is formed on the ultrafine thread 121 forming the outer thread 120. However, it may only be required that in the medical suture thread 100, the inner-filament cover layer 112 is formed on the outer surface of the ultrafine thread 111 not exposed at the outer surface of the medical suture thread 100.

Thus, in the medical suture thread 100, the inner-filament cover layer 112 may be formed only on the ultrafine thread 111 forming the core thread 110. That is, in the configuration of the medical suture thread 100, the outer-filament cover layer 122 of the ultrafine thread 121 forming the outer thread 120 can be omitted. Alternatively, in the configuration of the medical suture thread 100, the inner-filament cover layer 112 may be formed on the ultrafine thread 111 forming the core thread 110, and on the other hand, the outer-filament cover layer 122 may be formed only on a portion of the outer thread 120 exposed at the outer surface other than a portion not exposed at the outer surface due to overlapping of the ultrafine threads 121.

In the above-described embodiment, in the medical suture thread 100, the inner-filament cover layer 112 of the ultrafine thread 111 forming the core thread 110 and the outer-filament cover layer 122 of the ultrafine thread 121 forming the outer thread 120 are formed with the same thickness (a weight of 0.1% with respect to the total weight of each of the ultrafine threads 111, 121). However, the inner-filament cover layer 112 and the outer-filament cover layer 122 may be formed with different thicknesses.

Thus, the inner-filament cover layer 112 may be formed thinner than the outer-filament cover layer 122, for example. With this configuration, an increase in the outer diameter of the medical suture thread 100 can be suppressed while the bendability of the entirety of the medical suture thread 100 is improved. Thus, favorable operability can be ensured. The inner-filament cover layer 112 may be formed thicker than the outer-filament cover layer 122. With this configuration, a loss of the inner-filament cover layer 112 due to abrasion can be reduced. Moreover, the bendability can be maintained over a long period of time.

In the above-described embodiment, the core thread 110 includes the multiple twisted ultrafine threads 111. Specifically, in the configuration of the core thread 110, two bundles of multiple gathered ultrafine threads 111 are twisted. However, in the configuration of the core thread 110, three or more bundles may be twisted. The core thread 110 may be formed in such a manner that multiple bundles of multiple ultrafine threads 111 are braided. In addition, a configuration including multiple ultrafine threads 111 linearly arranged in parallel may be employed. The core thread 110 may include a single ultrafine thread 111.

In the above-described embodiment, the outer thread 120 is formed in such a manner that the multiple ultrafine threads 121 are braided. Specifically, the outer thread 120 is formed in such a manner that five bundles of multiple gathered ultrafine threads 121 are braided. However, the outer thread 120 may be formed in such a manner that four or less or six or more bundles are braided. The outer thread 120 may include multiple twisted bundles of multiple ultrafine threads 121.

In the above-described embodiment, in the configuration of the medical suture thread 100, the outer thread 120 is formed outside the core thread 110. However, it may only be required that the medical suture thread 100 is a multifilament as a single thread including the assembly of multiple fibrous ultrafine threads. Thus, it may only be required that even in a case where the core thread 110 and the outer thread 120 cannot be clearly distinguished from each other in the medical suture thread 100, the inner-filament cover layer 112 is formed on the ultrafine thread arranged inside the multifilament and not exposed at the outer surface of the multifilament.

LIST OF REFERENCE SIGNS

100 Medical Suture Thread
110 Core Thread
111 Ultrafine Thread
111a Filament
112 Inner-Filament Cover Layer
120 Outer Thread
121 Ultrafine Thread
121a Filament
122 Outer-Filament Cover Layer

The invention claimed is:

1. A medical suture thread as a multifilament comprising:
a single thread having an assembly of a plurality of fibrous ultrafine threads,
wherein the ultrafine threads are arranged inside the multifilament,
an inner-filament cover layer made of 2-methacryloyloxyethyl phosphorylcholine (MPC) is formed on an outer surface of each ultrafine thread not exposed at an outer surface of the multifilament,
the inner-filament cover layer is formed to have a weight of equal to or greater than 0.05% and less than 0.3% with respect to a total weight of a filament forming each ultrafine thread, the inner-filament cover layer being formed on the filament, and
the inner-filament cover layer is made only of MPC or a content of MPC in the inner-filament cover layer is the highest as compared to other components forming the inner-filament cover layer.

2. The medical suture thread according to claim 1, wherein
the multifilament includes: a core thread having an assembly of a plurality of the ultrafine threads and arranged at a center portion of the multifilament; and an outer thread arranged outside the core thread and covering the core thread without the core thread being exposed, and
the inner-filament cover layer is formed on each ultrafine thread forming the core thread.

3. The medical suture thread according to claim 2, wherein
the core thread includes: a braided thread braided with the plurality of ultrafine threads; or a twisted thread in which the plurality of ultrafine threads is twisted.

4. The medical suture thread according to claim 1, wherein
an outer-filament cover layer made of the 2-methacryloyloxyethyl phosphorylcholine (MPC) is formed on an outer surface of each ultrafine thread exposed at the outer surface of the multifilament, and
the inner-filament cover layer is formed to have a smaller thickness than that of the outer-filament cover layer.

5. The medical suture thread according to claim 1, wherein
the inner-filament cover layer is formed to have a weight of 0.1% with respect to the total weight of the filament forming each ultrafine thread, the inner-filament cover layer being formed on the filament.

6. The medical suture thread according to claim 1, wherein
the inner-filament cover layer is formed to cover 50% or more of a surface area of the filament with a uniform formation density in each of axial and peripheral directions of the filament with a part of an outer surface of the filament being exposed.

7. The medical suture thread according to claim 1, wherein
an outer-filament cover layer made of the 2-methacryloyloxyethyl phosphorylcholine (MPC) is formed on an outer surface of each ultrafine thread exposed at the outer surface of the multifilament, and
the inner-filament cover layer is formed to have a smaller thickness than that of the outer-filament cover layer.

8. The medical suture thread according to claim 1, wherein
an outer-filament cover layer made of the 2-methacryloyloxyethyl phosphorylcholine (MPC) is formed on an outer surface of each ultrafine thread exposed at the outer surface of the multifilament,
the inner-filament cover layer is formed to have a smaller thickness than that of the outer-filament cover layer, and
the outer-filament cover layer is formed to have a weight of equal to or greater than 0.05% and less than 0.3% with respect to the total weight of the filament forming each ultrafine thread, the outer-filament cover layer being formed on the filament.

* * * * *